H. R. COURTNEY.
LUBRICATED LEAF SPRING FOR AUTOMOBILES AND OTHER VEHICLES.
APPLICATION FILED APR. 11, 1919.
1,319,270.
Patented Oct. 21, 1919.
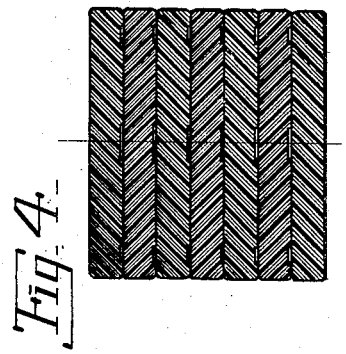
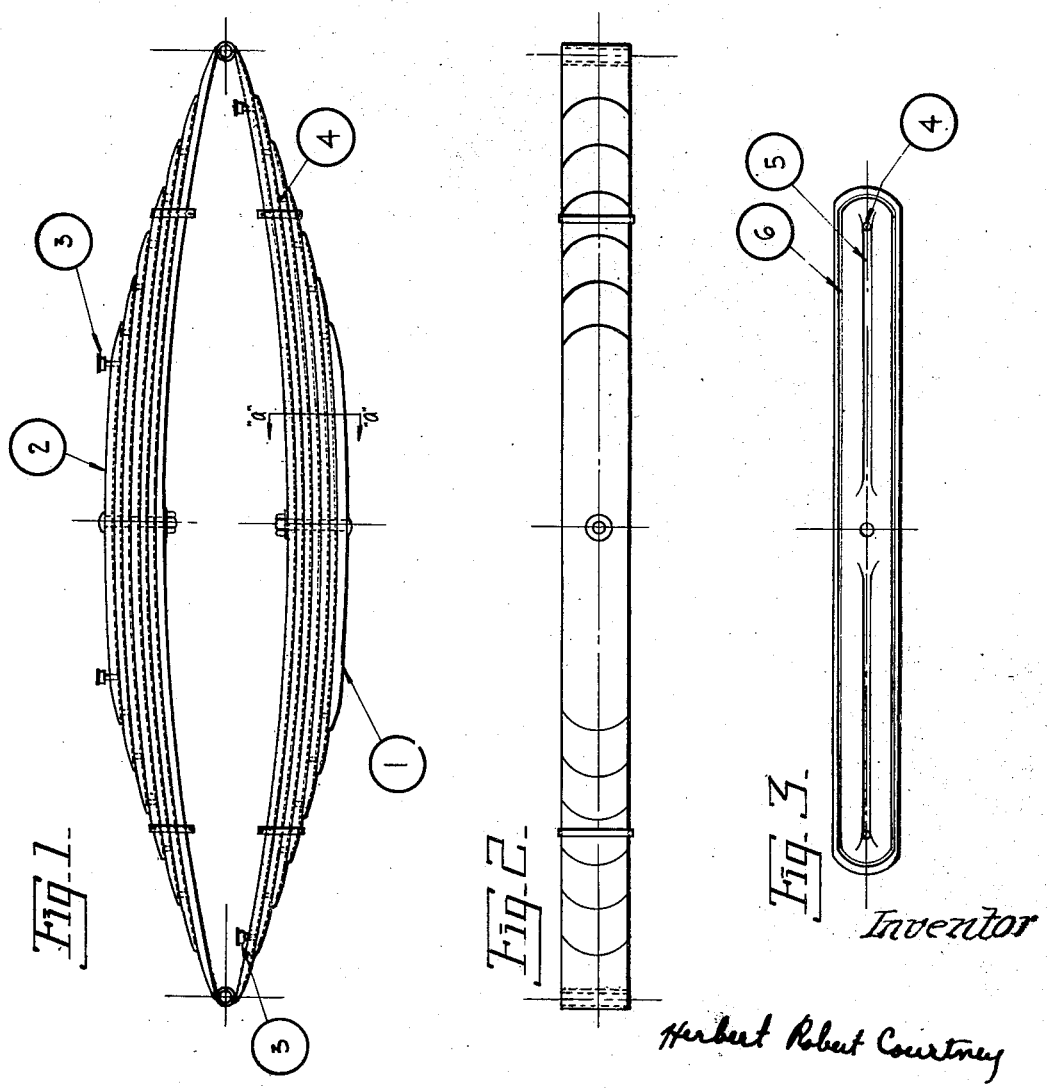
Inventor
Herbert Robert Courtney

UNITED STATES PATENT OFFICE.

HERBERT ROBERT COURTNEY, OF HENRY CLAY, DELAWARE.

LUBRICATED LEAF-SPRING FOR AUTOMOBILES AND OTHER VEHICLES.

1,319,270.     Specification of Letters Patent.     Patented Oct. 21, 1919.

Application filed April 11, 1919. Serial No. 289,439.

*To all whom it may concern:*

Be it known that I, HERBERT ROBERT COURTNEY, a citizen of the United States, residing at Henry Clay, in the county of New Castle and State of Delaware, have invented a new and useful Lubricated Leaf-Spring for Automobiles and other Vehicles, of which the following is a specification.

My invention provides for a new leaf spring of a design not heretofore known or made containing within the leaves thereof certain holes by means of which oil, grease, or any lubricant may be admitted through the leaves of the spring and distributed properly over the spring leaves to prevent rust and friction between the leaves reducing greatly the danger of spring breakage, practically eliminating all squeaks and other noises produced by ordinary springs not of this design.

The distribution of the lubricant over the inner surfaces of the spring leaves is accomplished by means of a lubricant groove or channel proportioned to the size and thickness of the spring leaf, which channel traverses the center of the under or upper side of the spring leaf depending upon whether the lower or upper spring is used or both or some portion thereof.

The further distribution of the lubricant is promoted and the seepage of excess lubricant from out between the spring leaves is practically prevented, also the admission of dust and other foreign substances practically eliminated by means of an absorbent channel filled with a felt strip or other absorbent running around the entire spring leaf on the under or upper side as the position of the spring may require. This felt strip or absorbent is placed a certain distance from the edge of the spring leaf depending on the size of the spring used. This absorbent serves to carry the lubricant around the entire spring leaf, prevents seepage of excess lubricant, excludes dust and other foreign matter and aids materially in producing a noiseless and easy riding spring.

I attain these objects by a leaf spring constructed as illustrated in the accompanying drawing in which Figure 1, is an elevation of a combined upper and lower spring, Fig. 2, is a plan view of a leaf spring; Fig. 3, is a plan view of a spring leaf showing the lubricant and absorbent grooves or channels; Fig. 4, is a section of the lower spring on the line "a"—"a" as in Fig. 1, showing the lubricant and absorbent grooves or channels.

Similar numerals refer to similar parts as illustrated in the drawing.

Part 1 of Fig. 1 indicates the entire lower leaf spring of a seven leaf spring. Part 2, the upper leaf spring of a seven leaf spring, any number of leaves may be used according to the necessity. Part 3, indicates the lubricant cup having a cap to exclude dust and screwed into part 4, which is the lubricant hole in the spring leaf which passes the lubricant from leaf to leaf. The lubricant is conveyed along each spring leaf by means of part 5 indicating the lubricant groove or channel from hole to hole, and also along the length of the leaf. Part 6, indicates the absorbent groove or channel which when filled with the felt strip or other absorbent takes up the seepage of lubricant admitted by part 4, and distributed by part 5, and by means of its power of absorption carries the lubricant completely around the spring leaf.

I claim:

A lubricated leaf spring comprising leaves each having on one of its surfaces a groove or channel extending completely around and inside the periphery of the leaf, an absorbent strip filling the groove, apertures extending through each leaf for the passage of lubricant from one leaf to another, and grooves in one surface of each leaf extending longitudinally thereof from the apertures to distribute lubricant over the contacting surfaces of the leaves.

HERBERT ROBERT COURTNEY.

Witness:
FRANK CLEVELAND COURTNEY.